Sept. 28, 1937.　　　　C. SAUZEDDE　　　　2,094,191

DIAPHRAGM SEAL

Filed Jan. 27, 1936

INVENTOR
Claude Sauzedde

BY

ATTORNEYS

Patented Sept. 28, 1937

2,094,191

UNITED STATES PATENT OFFICE 2,094,191

DIAPHRAGM SEAL

Claude Sauzedde, Detroit, Mich., assignor to Detroit Hydrostatic Brake Corporation, Detroit, Mich., a corporation of Michigan Application January 27, 1936, Serial No. 60,985

10 Claims. (Cl. 60—54.6)

The present invention relates to means for sealing chambers in which reciprocating elements are mounted to be moved in response to fluid pressure in the chambers. It has to do more particularly with hydrostatic brake systems wherein pistons, movably received in chambers and connected to brake shoes, are moved with respect to their chambers by fluid under pressure. Sealing means for this purpose is shown in my prior Patent No. 1,964,745, issued July 3, 1934, to which attention is invited.

The primary object of the present invention is to provide a sealing means, between a piston head and the wall of a cylinder in which it reciprocates, which is positively non-leakable and which is designed to embody high wear resisting properties. The sealing means is in the form of a diaphragm, formed of such elastic material as rubber, and the material of the diaphragm is surface bonded to an annular metal reinforcing body. For example, if rubber is employed it is vulcanized to the metal body and in order to increase the tenacity of the surface bond, the annular body is provided with serrations. In assembling the seal in the cylinder, it is retained therein by a retainer which firmly presses the metal reinforce into engagement with an annular seal or shoulder, the metal reinforce being the only part of the diaphragm which is placed under pressure by the retaining element, with the result that the elastic material of the diaphragm may stretch or deform to accommodate movement of the piston, against the head of which the diaphragm is pressed by fluid under pressure, without tending to destroy the sealing relationship between the annular body and the cylinder wall.

Other objects of the invention will become apparent from the following description in which reference is had to the accompanying drawing wherein, Figure 1 is a section of the present seal;

Like characters of reference are employed throughout to designate corresponding parts.

Figure 1:
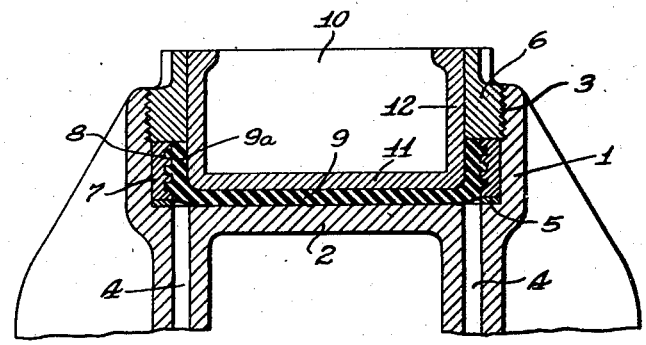

Referring to Fig. 1, the numeral 1 designates a metallic cylindrical body closed at one end by a transverse wall 2 and being internally threaded at 3 adjacent to its other end which is open. One or more ports 4 are provided in the wall 2 for the purpose of conveying fluid thereto under pressure. The means for supplying fluid to the interior of the cylindrical body 1 through the ports 4 has not been shown here because it forms no part of the invention and might be of any of the well known types of apparatus already available in the brake field.

Contacting with the wall 2, within the cylindrical body 1, is an annular seal 5. The seal 5 is preferably formed of metal which is comparatively soft Aluminum has been found to be most satisfactory for this purpose. Held in firm contact with the seal 5, by a retainer element 6 screwthreaded into the end 3 of the cylindrical body 1, is an annular metallic body 7 having its inner face formed with a series of serrations 8. A cup shaped diaphragm 9 has an integral annular wall 9a extending around the periphery thereof. The cup is formed of rubber and the annular wall 9a is vulcanized to the inner surface of the annular body 7.

The retainer element 6 is also of annular form and a piston extends therethrough so that its end or head 11 engages the face of the diaphragm 9 and its side wall 12 engages the inner surface of the annular projection 9a on the diaphragm.

It becomes apparent from the foregoing description that the retainer element 6 may be tightened against the annular body 7 so as to hold the latter in firm engagement with the aluminum seal 5, without compressing the material of the diaphragm. The annular body 7, being rigid, permits sufficient pressure to be brought to bear on these parts to afford a positive sealing action, and because the rubber itself is not subjected to this sealing pressure it is not liable to wear or shear off at the point where it is secured to the cylinder wall.

In operation, fluid under pressure is supplied to the cylindrical body 1 through the ports 4 by any suitable source (not shown) and the fluid causes the diaphragm to flex and deform so as to press the piston 10 outwardly of the body 1. In order that the utility of such action may be understood, it is pointed out that the piston 10 will ordinarily be connected to a brake shoe and such movement carries the shoe into engagement with a brake drum. In view of the fact that such constructions are already known in the art the same has not been illustrated here. When the pressure is relieved from the fluid the piston will resume its normal position (illustrated in the drawing) as a result of the pressure exerted by the usually employed brake shoe retracting springs (not shown).

Figure 2:
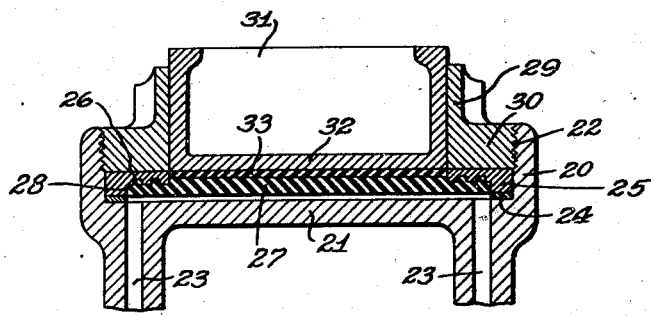
Fig. 2 is a section of a modified seal.

Referring to Fig. 2 the numeral 20 designates a cylindrical body, closed at one end by a transverse wall 21, and having its other, open end internally screwthreaded as indicated at 22. The wall 21 is provided with one or more ports 23 extending therethrough and adapted to convey fluid under pressure into the cylinder 20. Engaging the end wall 21, within the cylinder 20, is an annular seal 24 formed of soft metal, preferably aluminum. In engagement with the annular seal 24 is an annular body 25, formed of angular cross section, and having one of its inner faces provided with a series of serrations 26. An elastic disk 27, preferably formed of soft rubber so as to be readily yieldable, is vulcanized to the serrated surface 26 of the annular body 25 and also to the inner annular surface 28, the face of the elastic disk 27 being in plane with the corresponding face of the annular body 25. The serrations 26 in the annular body 25 increase the tenacity of the surface bonding action provided by vulcanization.

A cylindrical body 29 has an outwardly directed flange 30 on its inner end which is externally threaded and received in the screwthreads 22. The inner surface of the cylindrical body 29, which is of a diameter substantially corresponding to the inner diameter of the annular body 25, is machined smooth and slidably supports a piston 31 so that its head end 32 is adapted for engagement with the diaphragm. However, the head end 32 of the piston is not permitted to engage the soft rubber disk 27 for the reason that when subjected to high fluid pressure in the presence of opposition to movement of the piston 31 the rubber has a tendency to project into the space between the piston and the inner surface of the cylindrical body 29. Even though the clearance between these bodies comprises only a working clearance this action is present and ordinarily causes wear of the diaphragm disk at this point. To overcome this wear condition, and also to resist shearing of the comparatively soft rubber from its metal reinforce 25 the invention provides a comparatively thin disk 33 of relatively hard rubber between the disk 27 and the piston head 32. The hard rubber disk 33 is preferably vulcanized to the disk 27 and also to the inner annular surface 34 of the metal reinforce 25.

Figure 3:
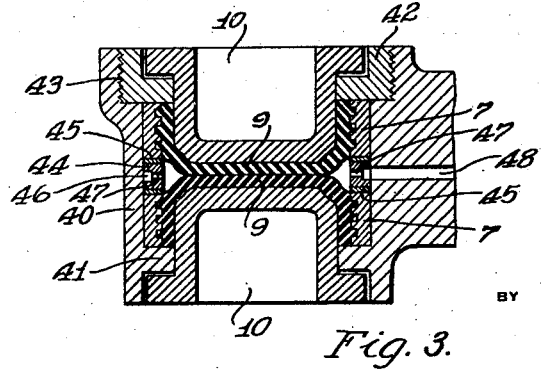
Fig. 3 is a section illustrating a double seal arrangement.

In the structure disclosed in Fig. 3 the diaphragm is constructed identical to that shown in Fig. 1, that is, each diaphragm shown in Fig. 3 comprises an elastic disk 9 with an annular metal reinforce 7 extending around the periphery thereof. Two of such diaphragms are mounted in a cylinder 40 in opposed relationship, one of the reinforces 7 being seated against an internal shoulder 41 and the other being held in the cylinder 40 by a retainer element 42 which is received in the screwthreaded end 42 of the cylinder 40. Between the two metal reinforces 7 is a spacer ring 44 having a seal 45, preferably of aluminum, interposed between the faces thereof and the adjacent metal reinforces 7. The retainer element 42 is tightened into place so as to hold the above described parts in firm engagement one with another.

The spacer ring 44 has a circumferentially extending groove 46 and a plurality of radially disposed ports 47 extend from the inner surface of the ring and open into the groove. In addition, the groove 46 registers with a port 48 extending through the side of the cylinder and through which fluid under pressure is adapted to be conveyed to the space between the diaphragms 9.

Each of the forms of the invention thus disclosed presents a number of characteristic features, but all of them include certain of these features in common.

For instance, in each of the forms the assemblage not only provides for non-leakage conditions with respect to fluid pressure but also to ingress of air. And to provide this result certain conditions must be met, due to the fact that the elastic diaphragm with its rigid margin is not secured in position as by the use of threads, but is slipped into position. While the follower element—7, 30, or 42—is threaded in place, the opposite face or end of the rigid member of the diaphragm is located at a point accessible to fluid pressure. It is obvious that, if the bonded connection between the elastic body portion of the diaphragm and the annular member to which it is anchored by the bonding action is to be maintained, the annular member must not be deformable, the reason for the use of a rigid structure at this point. While it might be possible to form the end face of the member with a perfectly-machined face and to similarly provide the seating face of the cylinder which opposes it, the metal of the two opposing faces is necessarily non-deformable so that unless a perfect fit between the two faces is had, there is possibility of leakage. And where, as in the present disclosure, the portage for the fluid is located in the vicinity of such faces rather than at a point remote from the faces, possibility of leakage between the faces remains.

In the forms disclosed this condition is met by the use of the softer metallic seal—5, 24 or 45—which is sufficiently deformable as to ensure a non-leakage condition with respect to these faces. The seal is metallic so that movement of the annular member of the diaphragm is not excessive in setting up the deformation needed, the metal being preferably aluminum as above indicated. In this way it is possible to ensure the non-leakage condition at this point, and at the same time permit the elastic portion of the diaphragm to be accurately positioned; as indicated in Fig. 1, for instance, the elastic portion rests upon the cylinder wall 2 without being placed under any tension effect on the diaphragm at the periphery of the plane portion; if the material of the seal 5 were textile or rubber, or of a completely deformable material, the pressure-applying movement of member 7 could readily affect the distance conditions and apply a permanent strained effect at this particular portion of the elastic diaphragm. Hence, by the use of the metallic seal, all pressure is taken from the elastic body portion so far as the positioning of the diaphragm is concerned, with the result that the latter is not weakened at this point which forms the most vulnerable point of the diaphragm in service due to the fact that it represents the change from the pseudo-rigid portion represented by the anchoring zone of the body portion and the completely elastic portion.

In addition, the assemblage permits the complete elasticity action required to meet the difficult conditions of braking service for which the diaphragm is especially designed. The piston must be instantly responsive to the changes set up in the portage through the brake pedal application and release, and the diaphragm must be capable of producing this result although itself in a stationary and anchored position. If, then, the pressure of fluid in applying the brakes and the pressure required to discharge the fluid from the cylinder is made applicable in the immediate vicinity of the anchoring zone of the elastic body portion, as is indicated in the forms shown, the ability to withstand the effects of these required movements of the body portion at this point without at the same time tending to break down the bonding connection, is of great importance.

These conditions are met herein by the use of a body portion which, in Fig. 1 is planar excepting for the anchoring zone, and completely planar in the form of Fig. 2, and varying from this in Fig. 3 because of the presence of the dual piston arrangement which necessitates the introduction of the fluid between opposing diaphragms and thus requires the presence of the space produced by the bevelled zones of the pistons. In other words, each of the forms has the anchoring zone of the elastic body-portion a direct continuation of the body-portion which co-operates with the end zone of the piston, and with the free end of the elastic portion positioned most remote from the planar face of the piston.

In these ways, the assemblage is made non-leakable, is instantly responsive to the changed conditions of pressure in the supply line, even when the supply portage lies in the vicinity of the anchored zone of the body-portion, and the structure is simple and readily fashioned, and adapted for long service conditions.

Although specific embodiments of the invention have been illustrated and described, it is to be understood that various changes may be made within the scope of the appended claims without departing from the spirit of the invention, and such changes are contemplated.

What I claim is:—

1. In piston and cylinder assemblages, wherein the piston may be rendered active in one direction by fluid pressure or such piston may be rendered active to move fluid in one direction under pressure, and wherein the cylinder assembly includes two portions movable relative to each other and also includes the fluid portage, the combination therewith, of sealing means operative to seal the piston chamber to prevent escape of fluid, said means including an elastic body portion and a rigid inelastic and non-deformable annular portion anchored thereto, and an annular metallic sealing portion capable of small deformation, said rigid and sealing portions providing a pressure-developed non-leakage packing zone between the two cylinder portions by the relative movement of such cylinder portions toward each other and with such packing zone annular with respect to the elastic body-portion, said elastic body portion being positioned between the fluid portage of the cylinder and the piston, the anchoring zone of the elastic body portion being positioned to be free of the packing-producing pressure and movable with the piston by fluid or piston pressure dependent upon the pressure origin and with such movement free of strain upon the anchoring zone tending to destroy the anchored relation, said elastic body portion conforming to the generally planar end zone of the piston and having the anchored zone as a direct continuation thereof, the free edge of the anchored zone being most remote from such planar face of the piston.

2. An assemblage as in claim 1 characterized in that the elastic body portion and its anchored zone is substantially cup-shaped, with the anchored zone forming the sides of the cup.

3. An assemblage as in claim 1 characterized in that the opposite ends of the anchoring zone of the rigid non-deformable annular portion are of substantially similar width on a cross-section of the portion.

4. An assemblage as in claim 1 characterized in that the fluid portage of the cylinder is located to present the fluid in the vicinity of the anchoring zone of the sealing means.

5. An assemblage as in claim 1 characterized in that the elastic body portion and its anchoring zone are of generally cup-shape cross-section with the anchoring zone a direct continuation of the body-portion to thereby present the anchoring zone and the rigid inelastic and non-deformable annular portion to which the anchoring zone of the elastic body-portion is secured as the side walls of such cup-formation, the thickness of the elastic portions of the sides and bottom of the cup being substantially equal.

6. An assemblage as in claim 1 characterized in that the elastic body portion and its anchoring zone together with the annular rigid non-deformable portion anchored thereto extend in a generally planar direction, with the body portion carrying an inelastic planar member facing the planar face of the piston.

7. An assemblage as in claim 1 characterized in that the annular member of small deformation is of aluminum characteristic.

8. An assemblage as in claim 1 characterized in that a second piston opposes the first piston, and a second sealing means for the second piston opposes the sealing means of the first piston, the respective rigid members of the two sealing means being separated by a spacer member carrying portage co-operating with the portage of the cylinder, the several pistons being bevelled peripherally to provide an annular channel between the two sealing means with the channel in communication with the portage, whereby relative piston movements in directions to separate the pistons is provided by fluid from the channel.

9. In combination, a cylindrical body having an internal abutment at one end, a pair of annular metal reinforces, a spacer ring between said reinforces, means for clamping said reinforces and spacer ring into sealing relation one with another and with said internal abutment, and a pair of elastic diaphragm surfaces each bonded at its periphery to a respective one of said metal reinforces.

10. In combination, a cylindrical body having an internal abutment at one end, a pair of annular metal reinforces, a spacer ring between said reinforces, means for clamping said reinforces and spacer ring into sealing relation one with another and with said internal abutment, and a pair of elastic diaphragm surfaces each bonded at its periphery to a respective one of said metal reinforces, said spacer ring having an external circumferential groove and ports extending therefrom to the inner surface thereof.

CLAUDE SAUZEDDE.